US011746662B2

(12) United States Patent
Loisel et al.

(10) Patent No.: US 11,746,662 B2
(45) Date of Patent: Sep. 5, 2023

(54) VANE FOR AN AIRCRAFT TURBOMACHINE

(71) Applicant: SAFRAN AIRCRAFT ENGINES, Paris (FR)

(72) Inventors: Bruno Marc-Etienne Loisel, Moissy-Cramayel (FR); Stephanie Aline Marie Deflandre, Moissy-Cramayel (FR); Eric Jacques Delcoigne, Moissy-Cramayel (FR); Franck Denis Daniel Limousin, Moissy-Cramayel (FR); Laetitia Nicole Person, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 16/968,515

(22) PCT Filed: Feb. 1, 2019

(86) PCT No.: PCT/EP2019/052521
§ 371 (c)(1),
(2) Date: Aug. 7, 2020

(87) PCT Pub. No.: WO2019/154734
PCT Pub. Date: Aug. 15, 2019

(65) Prior Publication Data
US 2020/0408099 A1 Dec. 31, 2020

(30) Foreign Application Priority Data
Feb. 8, 2018 (FR) ........................ 1851070

(51) Int. Cl.
F01D 5/28 (2006.01)
F01D 5/22 (2006.01)

(52) U.S. Cl.
CPC ............. *F01D 5/288* (2013.01); *F01D 5/225* (2013.01); *F05D 2220/323* (2013.01); *F05D 2240/24* (2013.01)

(58) Field of Classification Search
CPC ................................. F01D 5/225; F01D 5/288
See application file for complete search history.

(56) References Cited

U.S. PATENT DOCUMENTS 5,408,826 A * 4/1995 Stewart ................. F01D 21/045
60/909
9,963,980 B2 * 5/2018 Negri ...................... F01D 5/288
(Continued)

FOREIGN PATENT DOCUMENTS

EP 3006673 A1 4/2016
FR 2985759 A1 7/2013

OTHER PUBLICATIONS

International Search Report and Written Opinion received for PCT Patent Application No. PCT/EP2019/052521, dated Apr. 8, 2019, 15 pages (7 pages of English Translation and 8 pages of Original Document).

*Primary Examiner* — Courtney D Heinle
*Assistant Examiner* — John S Hunter, Jr.
(74) *Attorney, Agent, or Firm* — WOMBLE BOND DICKINSON (US) LLP

(57) ABSTRACT

A rotor vane for an aircraft turbine engine, the vane having an axis of rotation once it has been rigidly connected to a rotor and a stacking axis. The vane includes a blade extending between an internal platform and an external platform bearing at least one projecting lip. The external platform is configured to cooperate in a form-fitting manner with the complementary side edges of adjacent vanes. The rotor vane has wear-resistant covering of a lower side edge which extends over one wall of a substantially rectilinear first ridge of the platform and over one wall of a second ridge of the (Continued)

platform. The second ridge extends at least partially inside the lip and is inclined relative to the first ridge in a direction substantially parallel to a transverse axis of the lip.

8 Claims, 3 Drawing Sheets

(56) References Cited

U.S. PATENT DOCUMENTS

2012/0195766 A1* 8/2012 Cohin .................. F01D 5/288
                                                            416/241 A
2015/0369058 A1   12/2015 Negri et al.

* cited by examiner

VANE FOR AN AIRCRAFT TURBOMACHINE

TECHNICAL FIELD

The present invention relates to the general field of the manufacture of rotor vanes for an aircraft turbomachine.

BACKGROUND

The prior art comprises in particular document FR-A1-2 985 759.

Typically, an axial turbine in a turbomachine consists of a series of axial stages (along the axis of circulation of the gas flow) arranged in series. Each stage comprises a movable wheel with vane forming a rotor and a bladed distributor forming a stator. The movable wheel is rotated opposite the corresponding distributor.

In this patent application, the upstream and downstream are defined in relation to the normal flow direction of the air flows (upstream to downstream) through the turbomachine. The axis of rotation of the main rotor of the turbomachine is referred to as the "axis of the turbomachine". The axial direction is the direction of the axis of the turbomachine, and a radial direction is a direction perpendicular to the axis of the turbomachine and intersecting this axis. Similarly, an axial plane is a plane containing the axis of the turbomachine, and a radial plane is a plane perpendicular to this axis. The adjectives "internal" and "external" are used with reference to a radial direction so that the internal part of an element is, in a radial direction, closer to the axis of the turbomachine than the external part of the same element. The stacking axis of a vane is the axis perpendicular to the axis of the turbomachine, which passes through the centre of gravity of the innermost section of the blade of the vane (i.e. the section closest to the axis of the turbomachine). Typically, a turbomachine vane comprises a blade extending along the stacking axis of the vane, between the proximal and distal (i.e., internal and external) ends of the vane.

The movable wheel conventionally consists of an annular disc centered on the axis of rotation of the wheel to which a plurality of vanes are attached.

An example of a vane is shown in FIG. 1. A vane of this type is described in patent FR-B1-2 985 759. A schematically represented rotor wheel (60) and a disc (62) are shown in FIG. 1. A schematically represented aircraft turbomachine (64) is also shown in FIG. 1. This vane 10 comprises a blade 16 extending along the stacking axis X of the vane, between the proximal end 10A and distal end 10B of the vane 10. At its proximal end 10A, the vane comprises a platform 19 and a root 12 by which it is attached to the disc (not shown). At its distal end 10B, the vane 10 has a heel 14. When several vanes 10 are fixed to the disc, their heels 14 are arranged edge to edge so as to form a circumferential ring delimiting a surface of revolution around the axis A of rotation of the wheel. The function of this ring is, in particular, to delimit the external surface of the stream duct of the gas flows circulating between the blades 16 and to limit gas leaks at the distal end 10B of the vanes 10.

The heel 14 comprises a platform 20 externally delimiting the stream duct of the gas circulating between the blades 16, and having opposite lateral edges 21, 22. The platform 20 comprises an upstream part 24 called the "upstream spoiler" and a downstream part 28 called the "downstream spoiler". The heel 14 also comprises upstream 31 and downstream 32 sealing lips extending radially towards the outside from the external face of the platform 20. This lips have a general circumferential or transverse orientation with respect to the axis of rotation of the wheel. Each of the lateral edges 21, 22 of the platform has, between the upstream 31 and the downstream 32 lips, a profile substantially in "Z".

When several vanes 10 are fixed on the disc, the upstream 31 and downstream 32 lips are arranged edge to edge so as to form a rotating ring of axis A, this ring being contained substantially in a radial plane. One of the functions of such a ring is to limit the clearance existing between the vanes 10 and a casing (not shown) which surrounds the vanes 10 in order to limit the gas leakage at this point. This casing carries an abradable annular covering which can cooperate by friction with the lips of the vanes in order to limit these leaks by labyrinth effect.

In order to dampen the vibrations to which the vanes 10 are subjected during operation, the vanes 10 are mounted on their disc with a torsional stress around their stacking axis X. The geometry of the heels 14 is such that each vane 10 is placed under torsional stress by bearing on the neighbouring vanes 10 mainly along lateral faces 34 of the upstream lip 31, within the framework of the vane geometry shown. The lateral faces 34 thus define the inter-vanes contact surfaces and are the site of high friction during operation of the turbomachine. In order to be protected against wear, the lateral faces 34 are provided with a covering or insert of friction-resistant material. This can, for example, be a material marketed under the brand name Stellite®. This wear-resistant covering 36 is best seen in FIG. 2.

Typically, this wear-resistant covering 36 is applied to the lateral faces 34 by welding, e.g. drop welding, which involves the creation of an electric arc to melt the material. This is often a manual operation, the Stellite® type alloy being in the form of a liquid drop during deposition.

The Stellite® alloy is a steel alloy with a high content in chromium (Cr) and cobalt (Co). It may also contain a small amount of tungsten (W) or molybdenum (Mo) and a small amount of carbon (C). The Stellite® alloy is not forgeable and must be either cast or welded to an object of which it forms part or into which it is inserted.

Cracks have been observed to develop after the drop of Stellite® has been deposited on vanes, resulting in the scrapping of the vanes.

The present invention offers a simple, effective and economical solution to this problem.

SUMMARY OF THE INVENTION

The present invention provides a rotor vane for an aircraft turbomachine, this vane having an axis of rotation once it has been rigidly connected to a rotor and a stacking axis and comprising a blade extending between an internal platform and an external platform bearing at least one projecting lip, said blade comprising a pressure side and an suction side and said external platform comprising pressure side and suction side lateral edges, located on the side of said pressure side and suction side respectively, and configured to cooperate in a form-fitting manner, and in particular by interlocking, with complementary lateral edges of adjacent vanes, each of said lateral edges comprising a wear-resistant covering, characterized in that the wear-resistant covering of the lateral edge located on the side of said pressure side extends over one wall of a substantially rectilinear first ridge of the platform, and over one wall of a second ridge of the platform, which extends at least partially in said lip and which is inclined with respect to said first ridge in a direction substantially parallel to a transverse axis of elongation of the lip.

The wear-resistant covering is thus deposited on ridges which stiffen the vane and limit the risk of cracks appearing during this deposition. These ridges make it possible to thicken the areas where the wear-resistant covering is applied as required, thus ensuring better heat dissipation during the deposition process and thus reducing the risk of crack formation.

In addition, the shape of the ridges is adapted on the one hand to limit their size and that of the covering, and on the other hand to prevent the latter from contacting with the aforementioned abradable covering extending around the wheel and in which the lips of the heel are intended to form annular grooves during operation. In the event that the lips are inclined with respect to a plane perpendicular to the axis of rotation of the wheel, and the ridges of each vane are aligned (and therefore not inclined with respect to each other), the second ridge may overflow beyond the lip and generate unwanted contact with the abradable covering, resulting in a widening of the corresponding groove and a risk of increased gas leakage in this area.

The vane according to the invention may comprise one or more of the following characteristics, taken in isolation from each other or in combination with each other:
- said first ridge has a substantially constant thickness E1,
- said second ridge has a thickness E2 less than E1,
- the wear-resistant covering of the lateral edge located on the side of said suction side extends over a wall of a third ridge, this third ridge having a thickness E3 similar to E1,
- each ridge thickness is measured in a direction substantially perpendicular to a surface forming the ridge, or in a direction substantially perpendicular to a longitudinal median plane or an axis of elongation of the corresponding ridge,
- said wall of said second ridge extends over 20-50% of the height of the lip in which it extends, measured along the stacking axis,
- said lip comprises two opposite longitudinal ends, one of which comprises at least partially said wall of said second ridge, and the other of which comprises an extra thickness in a direction perpendicular to said axis of elongation,
- said lip is inclined with respect to a plane perpendicular to said axis of rotation,
- the vane comprises two protruding lips and said first ridge is located between these lips, and
- said second ridge has a first end connected to one end of said first ridge and a second free end located at said pressure side lateral edge.

The present invention further relates to a rotor wheel for an aircraft turbomachine, comprising a disc carrying on its periphery an annular row of vanes as described above.

The present invention also concerns an aircraft turbomachine, comprising at least one vane or wheel as described above.

BRIEF DESCRIPTION OF THE FIGURES

The invention will be better understood and other details, features and advantages of the invention will appear more clearly when reading the following description made by way of non-limitative example and with reference to the appended drawings in which.

DETAILED DESCRIPTION OF AN EMBODIMENT

Figure 1:
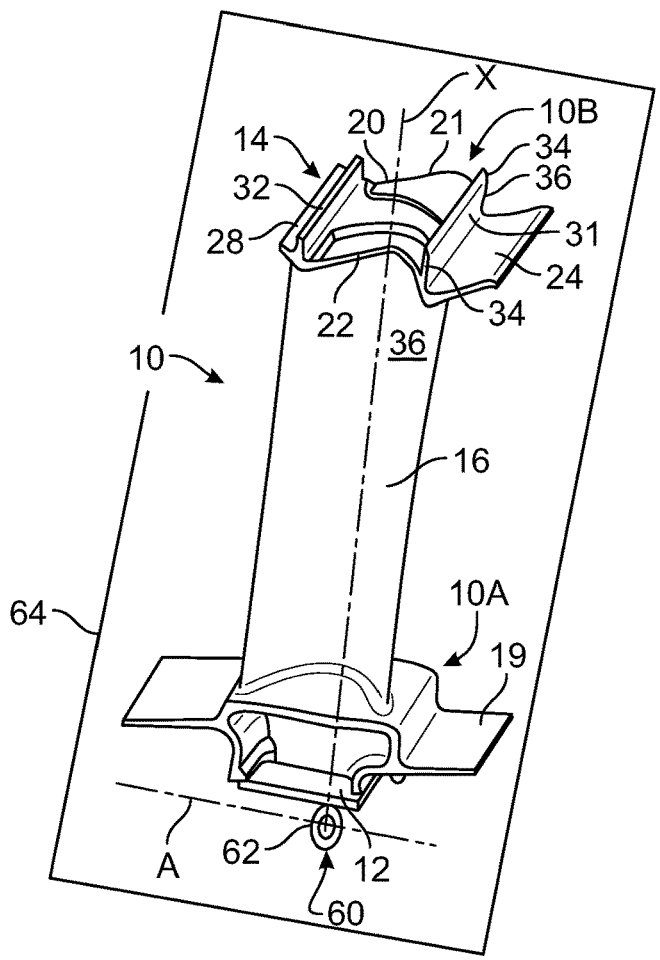
FIG. 1 is a schematic perspective view of a turbine wheel vane for an aircraft turbomachine.
Figure 2:
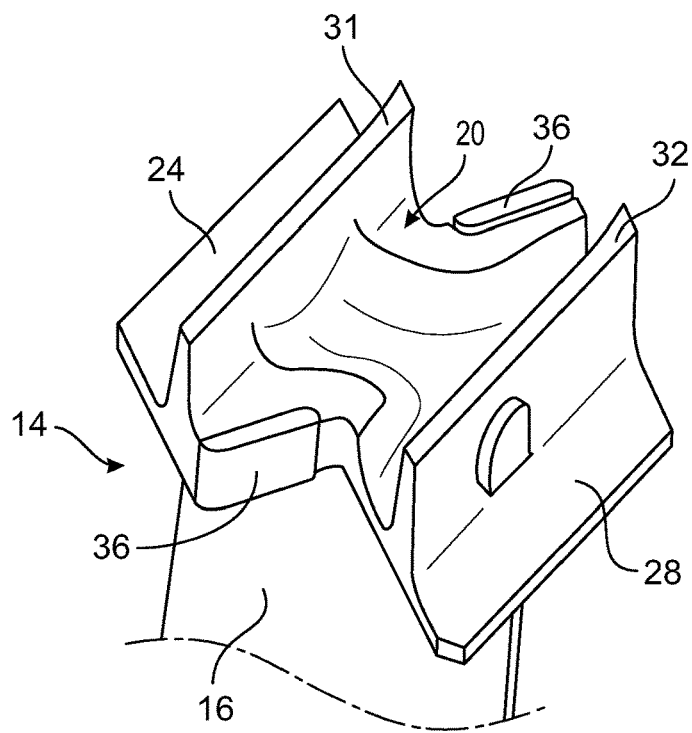
FIG. 2 is a larger scale schematic view of a part of another turbine wheel vane for an aircraft turbomachine.

The invention applies to a movable wheel vane 10 as described above with reference to FIGS. 1 and 2.

The vane 10 comprises at least one blade 16 which extends between two platforms, respectively internal 19 and external 20. The internal platform 19 is connected to the radially internal end of the blade and the external platform 20 is connected to the radially external end of the blade and comprises coverings 36 of wear-resistant material.

FIGS. 3, 4, 6 and 7 illustrate an embodiment of the invention.

Figure 3:
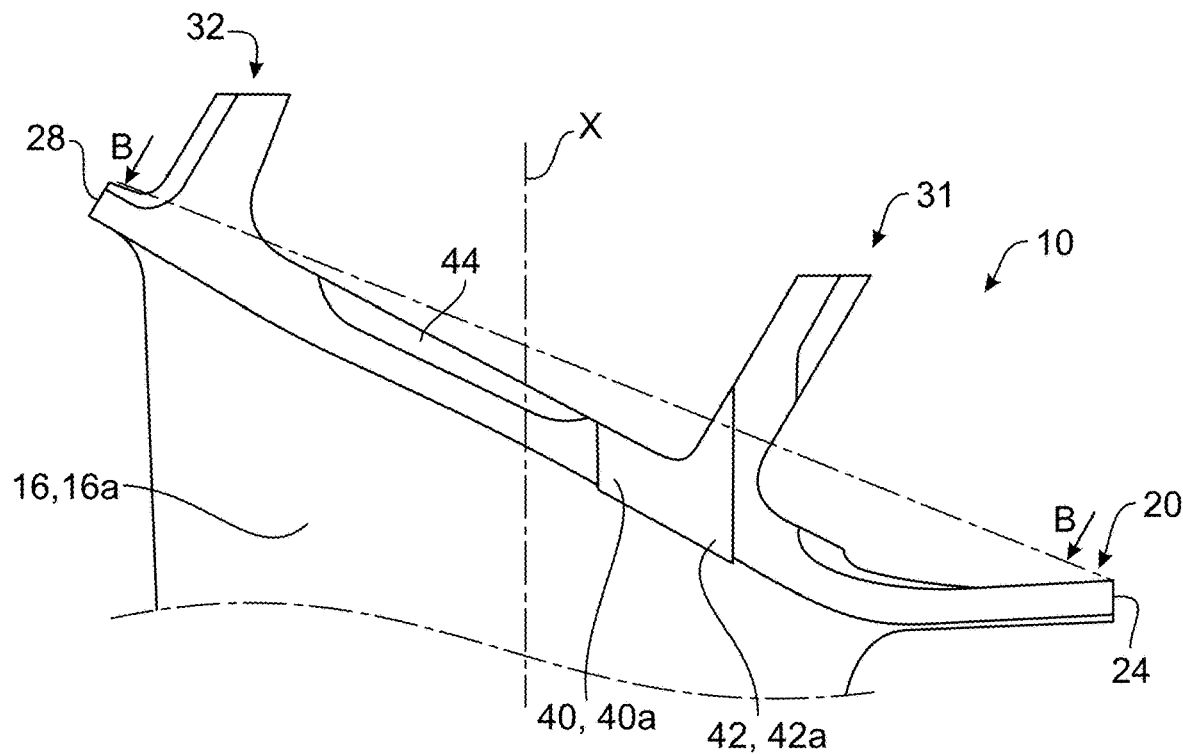
FIG. 3 is a schematic side view of a rotor vane according to the invention.
Figure 4:
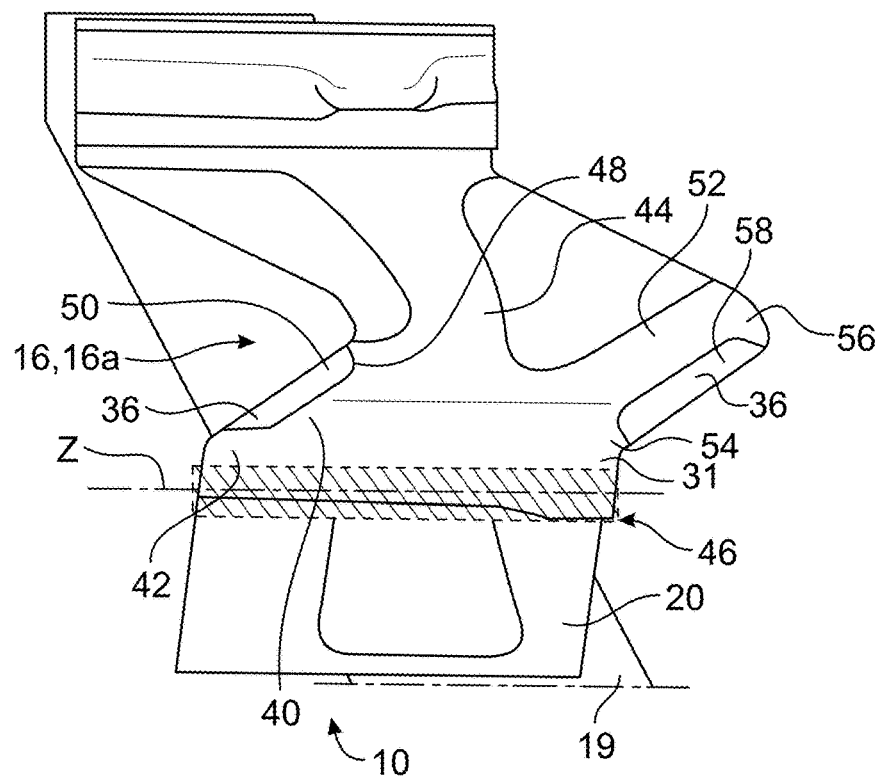
FIG. 4 is a schematic top view of the vane of FIG. 3, FIGS. 5 and 6 are detail views of FIG. 4, with FIG. 6 illustrating one of the characteristics of the invention as opposed to FIG. 5 which therefore does not illustrate the invention.

According to the invention, the wear-resistant covering 36 of the lateral edge 22 located on the side of the pressure side 16a of the blade 16 extends on a wall 40a of a first ridge 40 which is located between the lips 31, 32, and on a wall 42a of a second ridge 42 which extends at least partly into the lip 31. The ridges 40, 42 are an integral part of the platform 20. As can be seen in FIG. 3, the wall 42a extends over approximately 20-50% of the height of the lip 31, measured along the stacking axis X.

The first ridge 40 is substantially straight and has a downstream end connected to a boss 44 projecting on the external face of the platform 20. This boss has a general vane profile shape and forms an extension of the blade 16 radially towards the outside of the platform 20.

The second ridge 42 is substantially straight and has its downstream end connected to the upstream end of the first ridge 40. This second ridge 42 is inclined with respect to the first ridge 40 in a direction substantially parallel to a transverse axis Z of elongation of the lip 31. In other words, the second ridge 42 is substantially parallel to the lip 31 and the first ridge 40 is inclined with respect to the lip 31 and the second ridge 42.

Figure 7:
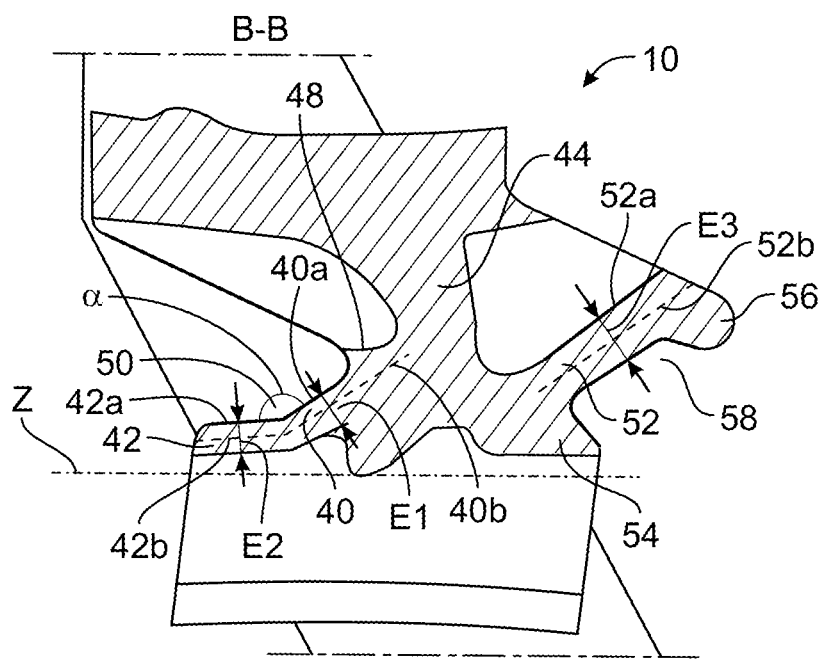
FIG. 7 is a schematic top view of the vane of FIG. 3, in a cross section view.

FIG. 7 is a cross-sectional view of the vane, with the cutting plane passing substantially through the ridges 40, 42 and the boss 44, and being substantially parallel to the plane of the platform 20. FIG. 7 shows the thicknesses E1, E2 of the ridges 40, 42 as well as their angle of inclination a, which is for example between 120 and 150°. In other words, the second ridge 42 forms a substantially zero angle with the lip 31 or the axis Z, and the first ridge 40 is inclined with respect to the lip 31 or the axis Z by an angle of between 30 and 60°.

Figure 5:
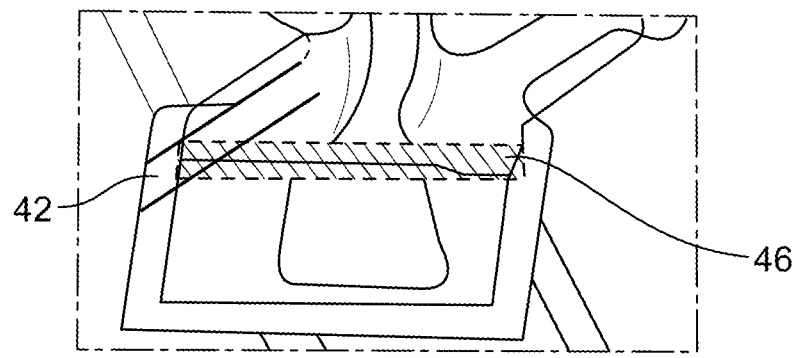
Figure 6:
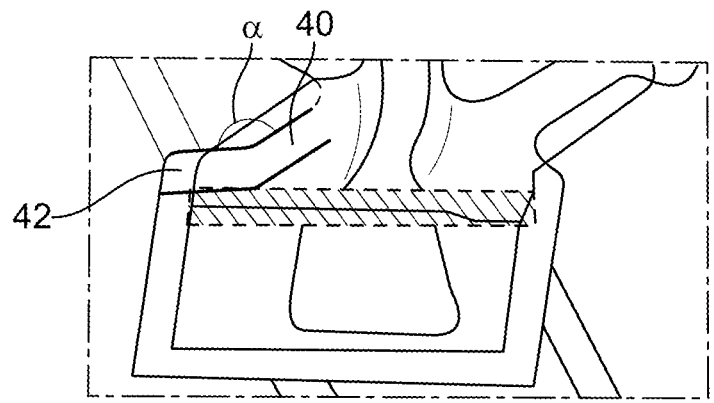

This angle α is also visible in FIG. 6 which shows the ridges 40, 42 inclined with respect to each other, as opposed to FIG. 5 which shows aligned ridges. In the latter case, and as explained above, the ridge 42 may extend beyond the lip and the wear-resistant covering it bears may widen the groove 46 formed in the abradable covering surrounding the vane, due to the rotation of the disc bearing this vane.

The groove 46 is partially represented here by a hatched area, the dimensions of which depend on the maximum dimensions of the lip 31. In the example shown, the lip 31 comprises a longitudinal end on the side of the pressure side 16a, in which the ridge 42 extends, and an opposite longitudinal end on the side of the suction side of the blade. The latter end is thickened in a direction perpendicular to the axis of elongation of the lip and has a general shape known as elephant's foot. This thickened end defines the greatest thickness of the lip and thus the thickness of the groove 46. This groove is annular and therefore intended to extend all around the wheel bearing the vane.

In the example shown, the ridges 40, 42 define between them and with a lug 48 present on the wall 40a of the ridge 40, a first recess 50 intended to receive the wear-resistant covering 36.

On the side of the suction side of the blade 16, the wear-resistant covering is located on a wall 52a of a third ridge 52 which has a general orientation substantially parallel to the ridge 40. The ridge 52 has a thickness of E3. The ridge 52 defines, with two lugs 54, 56 present at opposite ends of the wall 52a, a second recess 58 intended to receive the wear-resistant covering 36.

The thickness of a ridge is measured in a direction substantially perpendicular to a surface forming the ridge or to a longitudinal median plane or an axis of elongation of the ridge. The thickness of the ridge 42 can be measured in a direction substantially perpendicular to the axis Z. The axes of elongation of the ridges 40, 42 and 52 are referred to as 40b, 42b and 52b respectively in FIG. 7.

The thicknesses E1, E2 and E3, for example, are between 1 and 3 mm. The thickness E2 of the ridge 42 is preferably less than the thickness E1 of the ridge 40. For example, the thickness E1 is about 2 mm and the thickness E2 is about 1.5 mm. The thickness E3 is preferably similar to the thickness E1, and is for example about 2 mm. These thicknesses ensure good mechanical strength and prevent the formation of cracks when depositing the stellite.

The vane can be produced in the following way. First of all, it is made rough from the metal casting. The recesses 50, 58 are then filled with the wear-resistant coverings 36, e.g. by depositing the molten Stellite® material, which are located on the walls of the ridges. The vane can then undergo a machining operation to set it to the desired dimensions. During this last operation, the coverings 36 can be machined, as well as the lugs and ridges which delimit the recesses for receiving these coverings.

The invention claimed is:

1. A rotor vane for an aircraft turbomachine, the rotor vane having
an axis of rotation and a stacking axis and comprising
a blade extending between an internal platform and an external platform bearing at least one projecting lip, the blade comprising a pressure side and a suction side and the external platform comprising a pressure side lateral edge and a suction side lateral edge located on the pressure side and the suction side respectively, and each of the pressure side lateral edge and the suction side lateral edge configured to cooperate in a form-fitting manner with complementary lateral edges of adjacent vanes,
each of the pressure side lateral edge and the suction side lateral edge comprising a wear-resistant covering,
wherein the wear-resistant covering of the pressure side lateral edge extends over one first wall of a rectilinear first ridge, and over one second wall of a second ridge extending at least partially in the at least one projecting lip, the wall of the second ridge being inclined relative to the rectilinear first ridge in a direction parallel to a transverse axis of elongation of the at least one projecting lip, and the wall of the second ridge extending between 20 to a maximum of 50% of a height of the at least one projecting lip in which the second ridge extends, measured along the stacking axis.

2. The rotor vane according to claim 1, wherein the rectilinear first ridge has a thickness E1 of 2 mm.

3. The rotor vane according to claim 2, wherein the second ridge has a thickness E2 less than the thickness E1.

4. The rotor vane according to claim 2, wherein the wear-resistant covering of the lateral edge located on a side of the suction side extends over a third wall of a third ridge, the third ridge having a thickness E3 of 2 mm.

5. The rotor vane according to claim 1, wherein the at least one projecting lip comprises two opposite longitudinal ends, one of which comprises at least partially the second wall of the second ridge, and one other of which comprises an excess thickness in a direction perpendicular to the transverse axis of elongation.

6. The rotor vane according to claim 1, wherein the at least one projecting lip is inclined with respect to a plane perpendicular to the axis of rotation.

7. The rotor vane according to claim 1, wherein the second ridge has a first end connected to one end of the rectilinear first ridge and a second free end located at the pressure side lateral edge.

8. A rotor wheel for an aircraft turbomachine, comprising a disc carrying at a periphery an annular row of rotor vanes according to claim 1.

\* \* \* \* \*